United States Patent [19]
Fujisawa et al.

[11] 4,044,475
[45] Aug. 30, 1977

[54] TRAINING MACHINE FOR KEYBOARDS

[75] Inventors: Kenzo Fujisawa; Yoshiyasu Sakaedani; Akio Tsuji, all of Kamakura, Japan

[73] Assignee: Mitsubishi Precision Company, Ltd., Japan

[21] Appl. No.: 590,115

[22] Filed: June 25, 1975

[30] Foreign Application Priority Data
July 2, 1974  Japan .................................. 49-74976

[51] Int. Cl.² ........................................... G09B 13/00
[52] U.S. Cl. ........................................... 35/6; 35/8 R
[58] Field of Search ............... 35/5, 6, 8 R, 8 A, 9 R, 35/9 A, 9 B, 48 R; 40/52 R; 273/1 E

[56] References Cited
U.S. PATENT DOCUMENTS

| | | | |
|---|---|---|---|
| 3,154,862 | 11/1964 | Culpepper, Jr. | 35/9 R |
| 3,270,438 | 9/1966 | Ephraim | 35/5 |
| 3,371,321 | 2/1968 | Adams | 35/8 R X |
| 3,460,270 | 8/1969 | Blitz et al. | 35/6 |
| 3,660,912 | 5/1972 | Laplume | 35/9 A |
| 3,769,719 | 11/1973 | Meister | 35/6 |
| 3,874,669 | 4/1975 | Ariano et al. | 340/324 A |
| 3,894,346 | 7/1975 | Ward et al. | 35/6 |

FOREIGN PATENT DOCUMENTS

1,936,065  1/1971  Germany ........................... 40/52 R

OTHER PUBLICATIONS

*IBM Technical Disclosure Bulletin*; vol. 14, No. 10; Mar. 1972; pp. 3125-3126.

*Primary Examiner*—Anton O. Oechsle
*Assistant Examiner*—Vance Y. Hum
*Attorney, Agent, or Firm*—Robert E. Burns; Emmanuel J. Lobato; Bruce L. Adams

[57] ABSTRACT

A character signal including sixteen binary coded signal blocks each with an additional bit is stored in a closed loop memory and displayed, as corresponding characters on a display. In response to the display, a student strikes keys on a keyboard to deliver signal blocks, similar in coded form to the stored ones, to a comparator where they are successively compared with corresponding stored signal blocks. Upon the correct striking of the keys, the comparator applies a coincidence signal to the memory to change the value of the additional bit to erase the associated displayed character. Upon incorrect striking of the keys the changed bit is changed back to the original value to again display all the characters on the display.

4 Claims, 4 Drawing Figures

TRAINING MACHINE FOR KEYBOARDS

BACKGROUND OF THE INVENTION

This invention relates to a training machine for keyboards of input units for electronic computers, typewriters etc.

With the rapid advance of recent electronic computers and their peripheral equipments, input devices utilizing keyboards have been widely employed and it has been highly desirable to permit anyone to operate such input device as a part of usual business in offices while not requiring the special skill of specified persons. Conventional training means for such devices have resorted to training schools for typists, and education conducted in upper secondary schools. Those training means have not always fulfilled the quality and quantity of the goal of the training required in the present age. Further, such conventional training means are collectively conducted impose on students limitations as to the training schedule and place. Thus it has been impossible to train any individual person in accord with his or her own pace. This has been related to damage to the will of persons desiring training for the operation of a typewriter, input units etc. Therefore it is highly desirable to provide training machines for training an individual person to operate a keyboard of a typewriter, or the like, in a desired time by having the optimum training problems selected by him or her without troubling any other person.

Accordingly it is an object of the present invention to provide a new and improved training machine for effectively training an individual person for keyboards of input units for electronic computers, typewriters etc. with a simple, unique construction.

SUMMARY OF THE INVENTION

The present invention provides a training machine for a keyboard comprising in combination, program reader means for reading out a character coded signal including a plurality of binary coded signal blocks to form a word, display thereon means for displaying characters represented by the binary coded signal blocks of the word, keyboard means including a plurality of keys bearing different characters thereon, the keyboard means delivering binary coded signal blocks represented those characters borne on the keys when a student strikes the keys in accordance with the word displayed on the display means, the binary coded signal block from the keyboard means being identical to that from the program reader means for the same character, and control means connected to both the program reader means and the keyboard means to successively compare the binary coded signal blocks from the keyboard means with corresponding binary coded signal blocks from the program reader means thereby to successively erase the characters of the word displayed on the display means when the keys are correctly struck and to cause the word to be again displayed on the display means when a key is erroneous struck during the striking of the word, the control means further including means for adding to each of the binary coded signal blocks an additional bit for determining whether a character represented by the binary coded signal block with the additional bit is displayed on the display means.

In a preferred embodiment of the present invention the control means may include a first shift register connected to the program reader means to temporarily store the binary coded signal blocks therefrom one at a time, a second shift register connected to the first shift register to add the additional bit to each of the binary coded signal blocks transferred from the first shift register, the additional bit permitting the display of the character represented by a matching binary coded signal block on the display means, a third shift register connected to the second shift register to form a closed loop memory in which all the binary coded signal blocks of the word is stored while recirculating at a high speed therethrough, a latching circuit connected to the second shift register to latch each of the binary coded signals each time one of the binary coded signals is transferred thereto, a comparison circuit for successively comparing the binary coded signal blocks from the keyboard means with corresponding ones from the latching circuit to supply a coincidence signal to the second shift register when each signal block from the keyboard means is identical to the corresponding one from the latching circuit, the coincidence signal being operative to cause the additional bit to erase a corresponding character displayed on the display means, and the comparison circuit being operative, when both binary coded signals are different from each other, to supply a non-coincidence signal to the second shift register to again display all the characters of the word on the display means.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
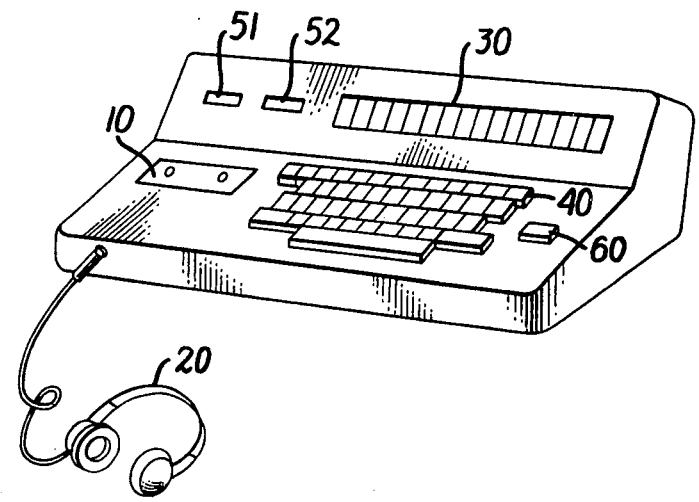
FIG. 1 is a perspective view of a training machine for a keyboard constructed in accordance with the principles of the present invention.

Referring now to the drawings and FIG. 1 in particular, there is illustrated a training machine for a keyboard of a typewriter constructed in accordance with the principles of the present invention. The arrangement illustrated comprises a tape reproducer or a program reader 10 and a head-phone 20 mechanically and electrically connectable to the program reader 10. The program reader 10 is disposed within a casing and includes a magnetic tape (not shown) having recorded thereon both audio signals for presenting before a student problems such as questions, commentaries on the questions, instructions for actions etc. and character signals in the form of binary coded numbers relating to the above-mentioned problems. The program reader 10 further includes a reproducer (not shown) for reproducing the audio and character coded signals and functions to issue training programs for operating keys on the keyboard. The character coded signals will be described in more detail hereinafter. The audio signal reproduced from the program reader 10 is transmitted to the head-phone 20 as shown by the reference character A in FIG. 2. The head-phone 20 converts the audio signal to an audio sound which is, in turn, received by the student.

On the other hand, the character coded signal reproduced from the program reader 10 is supplied to a display unit 30 as will be described in detail hereinafter. The display unit 30 includes a predetermined number, in this case sixteen, of display positions; one for each of the characters included in one problem or a word. Each of the display positions may selectively display all the character expressed by the character coded signal and which are also borne on keys on keyboard 40 (see FIG. 1). The term "character" used herein and in the claims includes, in addition to any one of the alphabetic letters, any symbols, or numerals, indicia etc. All of the components described are disposed within a single case which is not substantially larger than that required to house the keyboard so that it is portable.

As shown in FIG. 1, the keyboard 40 includes a plurality of keys disposed on the surface of the training machine and having different characters borne thereon. The student can strike any desired one of the keys on the keyboard 40 to produce a corresponding electrical coded signal. That electrical signal is identical to a character coded signal from the program reader 10 assigned to the same character as that borne on the strike key.

FIG. 1 also shows an error counter 51 and a time keeper 52 horizontally aligned with the display unit 30. The error counter 51 acts to count the number of errors made by the student due to improper striking of the keys and the time keeper 51 indicates a time interval in which the student has completed the particular training course. Further, a start switch 60 is disposed to the right as viewed in FIG. 1 of the keyboard 40 and a block 10 shown to the left of the keyboard 40 designates the program reader 10 as above described. The start switch 60 can be operated to put the arrangement of FIG. 1 in operation.

The operation of the arrangement as shown in FIG. 1 will now be described in conjunction with FIG. 2. The program reader 10 is responsive to the closure of the start switch 60 (see FIG. 1) to be driven to read an audio signal A and a character coded signal B out from the magnetic tape (not shown). This results in the read-out of one problem instructing one step of a training course. After having read out the problem, the program reader 10 is caused automatically to halt.

The audio signal A read out is transmitted to the student through the head-phone 20 as above described. The character coded signal B read out from the program reader 10 is supplied to a control unit 100 where it is stored in a memory (not shown in FIG. 2) disposed therein and also applied, as a corresponding character display signal C to the display unit 30, which will be later described in detail with reference to FIG. 3. The display unit 30 displays characters determined by the character display signal C. Since the display unit 30 is shown in FIG. 1 as including the sixteen display positions, the same can display a word, a sentence, a numeral a symbol or the like formed of at most sixteen display elements.

Upon receiving the instruction in the form of an audio sound, the student quickly strikes those keys correctly selected by him or her on the keyboard 40 while seeing the characters displayed on the display unit 30. The keyboard 40 successively produces coded signals assigned to those charactes borne on the struck keys and applies them, as keying signal D to the control unit 100. The control unit 100 compares that keying signal D with a corresponding character coded signal B previously stored therein.

For example, assume that the program reader 10 has read out a character coded signal B representative of a word "MOON" in the form of a series combination of coded signals for the individual characters. Then the character coded signal B is stored in the memory (not shown) included therein and thereafter it is supplied, as a corresponding character display signal C to the display unit 30. The display unit 30 responds to the character display signal C to display a word MOON thereon so that a first character M of the word is displayed on the leftmost display position as viewed in FIG. 1, and a second character O thereof is displayed on the next succeeding display position and so on. The last character N of the word MOON appears at the fourth display position counted from the left side of the display unit 30. Thus the student sees continuous characters forming the word MOON.

In order that the student strikes the keys on the keyboard 40 to type the word MOON he, or she first selects and strikes that key (not shown) bearing the character M thereon. This causes a keying signal D including the character M in the form of a binary number to be supplied to the control unit 100. In the control unit 100 the keying signal D for the character M is compared with a coded signal portion for the M included in the character coded signal for the word MOON stored in the memory disposed in the control unit 100.

In that event the character coded signal B portion is identical in the coded form to the keying signal D because the student has selected and struck the key symbol M. Then the control unit 100 produces a coincidence signal indicating that both signals B and D are identical to each other to rewrite MOON to "OON" in the memory in the manner as will be described later. As a result, the first character M of the word MOON displayed on the display unit 40 is erased while the characters OON remain displayed thereon. Assuming that the student then successively strikes those keys bearing the characters O, O and N thereon in the named order, the process as above described is repeated until all the characters are erased from the display unit 30.

When the student is to strike that key bearing the last character N thereon he or she may strike an erroneous key, for example, the neighbouring key bearing a character B thereon. This causes the control unit 100 to produce a non-coincidence signal indicating that the now typed character is not identical to the corresponding character stored in the memory (not shown) thereof, whereby the characters M, O and O already erased from the display unit 30 are again displayed on the display unit 30 which will be described in more detail hereinafter. Thus the word MOON is again displayed on the display unit 30. This means that the student should again strike the correct keys from the beginning.

After the particular correct word, in this case, the word MOON has been correctly typed, the characters on the display device 30 disappear while at the same time, the program reader 10 is automatically driven to read out an audio signal A and character signals B concerning the next succeeding problem. This results in the repetition of the process as above described.

In this way all the problems recorded on the magnetic tape (not shown) in the program reader 10 were presented before the student while the student has struck the keys on the keyboard 40 to complete one training course. At that time the number of errors made by the student and a time interval required for the student to correctly strike the keys on the keyboard 40 were estimated by an estimation indicator 50 (which includes the error counter 51 and the time keeper 52 as shown in FIG. 1) connected to the control unit 100 so that the number of errors is indicated on the error indicator 51 and the training time is indicated on the time keeper 52 (see FIG. 1). The indications on the indicator 51 and the time keeper 52 provide a measure of an extent to which the student has been trained. By comparing the measure thus given with the criteria predetermined for each of the training programs upon programming, the student is allowed to proceed to the next training course. Alternatively the student is required to repeat the process just completed. The student may be forced to be returned back to the beginning stage in accordance with the indications on the estimation indicator 50.

Figure 2:
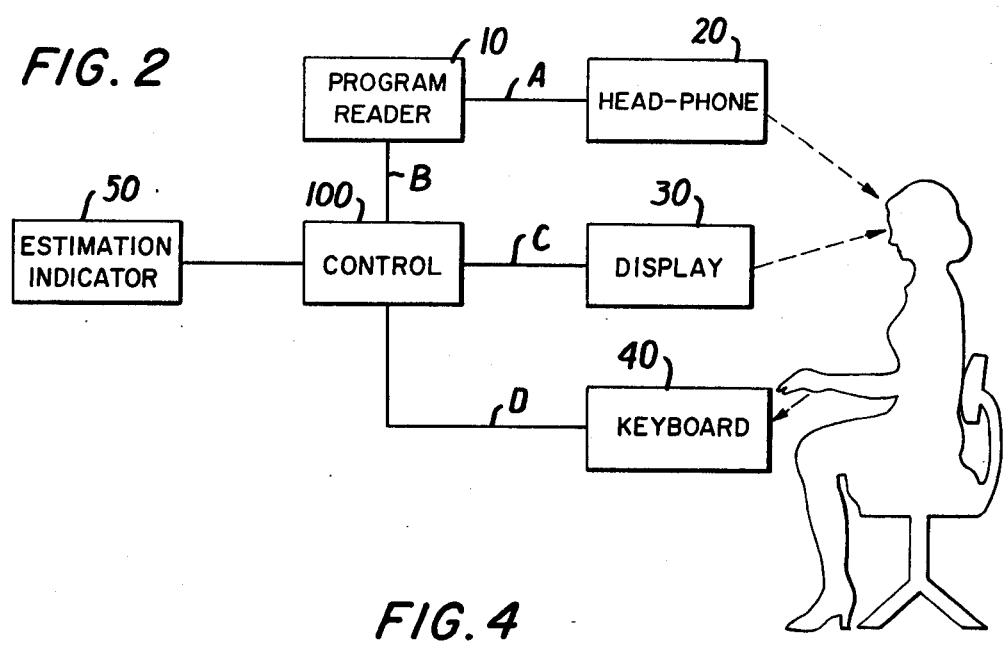
FIG. 2 is a functional block diagram of the training machine shown in FIG. 1.
Figure 3:
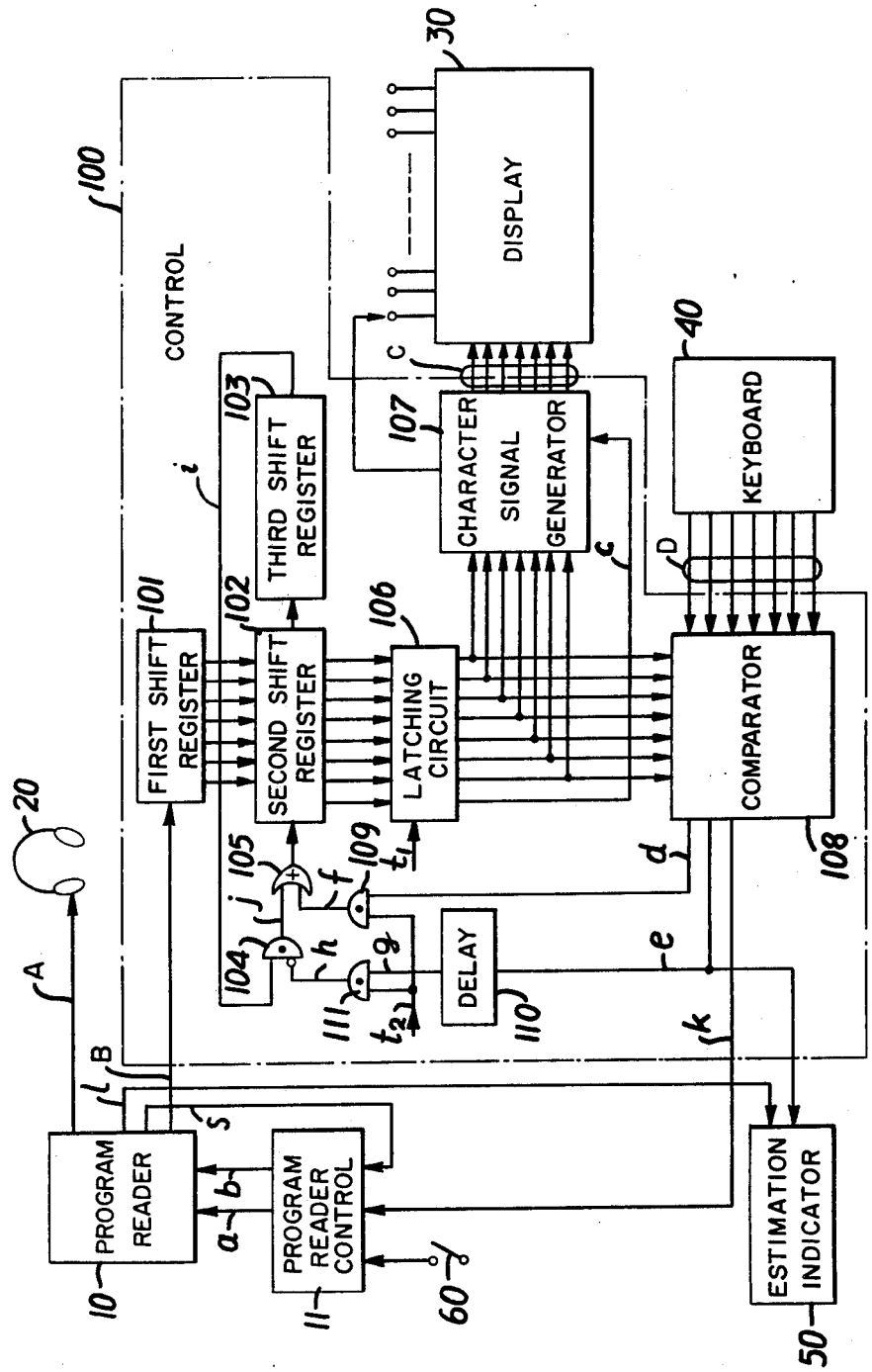
FIG. 3 is a combined block and circuit diagram illustrating in more detail the arrangement shown in FIG. 2.

The operation of the arrangement as shown in FIGS. 1 and 2 will now be in more detail described in conjunction with FIG. 3. When the student operates the start switch 60, a control circuit 11 for the program reader 10 supplies a starting signal $a$ to the program reader 10. The program reader 10 responds to the starting signal $a$ to move forward the magnetic tape (not shown) disposed therein to read out a first one of the programs recorded on the magnetic tape.

The magnetic tape has audio signals recorded in a first track, for example, in an upper track and character coded signals in a second or lower track thereon. Each of the character coded signals has a start-of-problem marker preceding the leading edge thereof through a predetermined record gap and a stop-of-problem marker succeeding the tailing edge thereof through a predetermined record gap.

A magnetic pickup (not shown) disposed in the program reader 10 converts the audio signal to a corresponding electrical signal which is, in turn, suitably amplified and conducted through the head-phone 20 to a student. The signal is designated by the reference character A. This instructs the student to take the particular training course.

Figure 4:
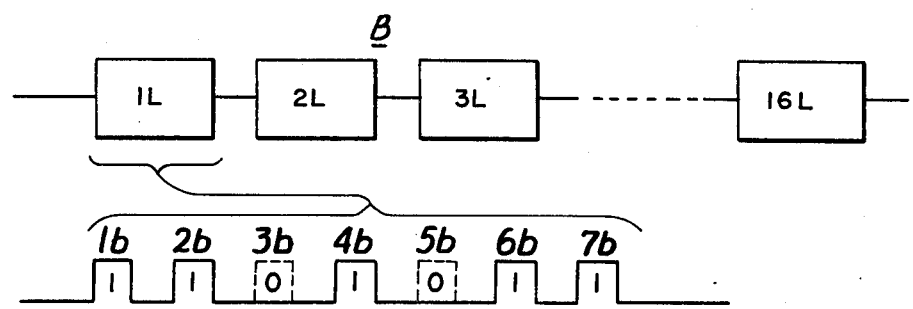
FIG. 4 is a graphical representation of a character coded signal used with the present invention.

On the other hand, the character coded signal B includes signal blocks equal in number to the display positions of the display unit 30. In the example illustrated, the character coded signal B includes sixteen signal blocks labelled 1L, 2L . . . , 16L as shown on the upper portion in FIG. 4 because the display unit 30 includes the sixteen display positions as above described. Each of signal blocks is comprised of a binary pulse train including seven bits or pulses for the following reason: a keyboard disposed, for example, on typewriters generally includes characters such as alphabetic letters, numerals, symbols, etc., amounting to less than one hundred. In order to identify about 100 types of the characters etc. in the form of binary numbers it is required to assign seven bits for each type of the characters, etc., because $2^7 = 128$. For example, the first signal block 1L is shown on the lower portion in FIG. 4 as including a first bit 1b having a value of binary ONE, a second bit 2b having also a value of binary ONE, a third bit 3b having a value of binary ZERO and so on. That is, the first signal block is of a binary member 1101011 assigned for a predetermined character. In this way each signal B including the sixteen signal blocks can represent one word, one phrase or the like formed of at most sixteen characters. As above described, each character coded signal has a start-of-problem marker and a stop-of-problem marker disposed in front and to the rear thereof although those markers are not illustrated in FIG. 4. Further information may be found in the description for FIG. 7 of West-German patent application No. 2,427,371 laid open to public inspection and the cited portion thereof is incorporated herein for reference.

The binary coded signal blocks of the character coded signal B are serially read out by another magnetic pick up (not shown) disposed in the program reader 10 and then serially delivered to the control unit 100 as previously described. The program reader 10 is similar to a tape reader unit such as shown in FIG. 8 of the above-cited West German patent application. Detailed information may be had by reference to the description for FIG. 8 of the cited application which is incorporated herein for reference.

As shown in FIG. 3, the character coded signal B is supplied to and stored in a first shift register 101 including bit positions whose number is equal to the number of bits forming each signal block. In the embodiment illustrated the first shift resistor 101 includes seven bit positions. More specifically, those seven bits forming the first signal block of the character signal B are successively stored in the first shift register 101 in the bit positions. Immediately after the last bit of the first signal block 1L of the character signal B has been stored in the first shift register 101, the content of the latter is simultaneously transferred in parallel relationship with respect to the bits to a second shift register 102 whereupon the first shift register 101 is ready for storing the second signal block 2L of the character coded signal B. The second shift register 102 has a number of bit positions greater by one than those of the first shift register 101 and in this case has eight bit positions for a purpose as will be apparent hereinafter.

The second shift register 102 is connected to a third shift register 103 including a plurality, in this case, 120 bit positions and connected to the second shift register 102 through an inhibit gate 104 and an OR gate 105 to form a closed loop memory including 128 bit positions. More specifically, the inhibit gate 104 includes one input connected to the third shift register 103 and an output connected to one input of the OR gate 105 including an output connected to the second shift register 102.

The second shift register 102 is operative to add an additional bit to each of the 7-bit signal blocks transferred thereto from the first shift register 101 and deliver an 8-bit signal block to the third shift register 103, in series relationship with respect to the bits and in response to a synchronizing pulse (not shown) applied thereto. At that time the second shift register 102 is cleared and immediately filled with second signal block 2L from the first shift register 101. Also the first register 101 is immediately filled with the third signal block 3L of the character signal B. The additional bit follows the seventh bit of each signal block.

Then the process as above described is repeated until the sixteen signal blocks of the character signal B amounting to $16 \times 8 = 128$ bits enter the closed memory including the second and third shift registers 102 and 103 with one bit occupying each bit position.

In this way the character signal forming the particular word has been read out from the program reader 10 and stored in the second and third shift registers 102 and 103 in the form of a closed loop. That character signal including at most 128 bits recirculates at a high speed through the closed loop and for an indefinite time. At that time the control circuit 11 receives a stop signal $s$ resulting from the stop-of-problem marker as above described from the program reader 10 to supply a stop signal b to the program reader 10 as shown in FIG. 3 to terminate its operation.

Under these circumstances the 16 signal blocks of the character signal B thus recirculating are successively developed on that output side of the second shift register 102 connected to a latching circuit 106 through eight leads. Then the latching circuit 106 is connected to a character signal generator 107 through light leads. Although not illustrated in FIG. 3, an address circuit is provided to determine if those 7-bits developed at the parallel outputs of the second shift register 102 are correctly arranged to represent a single character and also which of the 16 display positions of the display unit 30 is occupied by that character to provide an address signal $t_1$ for determining a time point when the character is displayed at the determined position on the display unit 30. Then the address signal $t_1$ is utilized to latch the associated binary coded signal block in the latching circuit 106.

Since the latching circuit 106 has a rewriting cycle dependent upon that address signal $t_1$ and since the address signal is produced each time one 8-bit signal block is shifted, that is, each time a piece of information representing a single character is developed, the latching circuit 106 successively delivers the binary coded signal blocks 1L, 2L . . . , 16L to the character signal generator 107 with the bits of each signal block put in parallel relationship. In that event the eighth or additional bit as above described is applied to the character signal generator 107 through the lead labelled the reference character c to determine whether or not the mating signal block displays a corresponding character on the display unit 30 in the manner as will be described later.

The display unit 30 connected to the character signal generator 107 includes a plurality, in this case sixteen, of $5 \times 7$ dot alphanumeric modules utilizing commercially available semiconductor luminescent diodes. and/or plasma gas discharge lamps. The character signal generator 107 is responsive to the applied signal block to produce such a control signal that among $5 \times 7 = 35$ luminescent elements (not shown) corresponding to $5 \times 7 = 35$ dots, only those luminescent elements displaying a character for which the signal block is assigned emit light. The control signal is applied to the display device 30 to display that character at a predetermined display position, for example, at the first display position.

The display unit 30 has further disposed therein both a control circuit for disposing the required characters at the sixteen display positions in the correct sequence and a sweep circuit for sweeping character signals at a high speed to display the required word as if it would be unintermittingly viewed by the student.

It has been found that according to the arrangement as shown in FIGS. 1 through 3, only several hundreds of millisecond elapes until a character coded signal B read out from the program reader 10 is displayed, as corresponding characters on the display unit 30. The word is maintained displayed on the display device 30 for an indefinite time.

The arrangement as shown in FIG. 3 further comprises a comparison circuit 108 connected to the keyboard 40 through seven leads, and also to the latching circuit 106 through seven leads. The comparison circuit 108 includes three outputs connected to one input of a first "AND" gate 109, to both a delay circuit 110 and the estimation indicator 50, and to the control circuit 11 respectively. The delay circuit 110 is connected to one input to a second AND gate 111. Both AND gates 109 and 111 include a second input receiving a synchronizing signal $t_2$ from a synchronization generator not shown. The AND gate 109 has an output connected to the other input to the OR gate 105 while the AND gate 111 has an output connected to an inhibiting input of the inhibit gate 104.

It is now assumed that an audio signal A read out from the program reader 10 instructs the student to quickly and correctly strike those keys on the keyboard 40 bearing thereon the characters displayed on the display unit 30 and in the displayed order. Then the student will successively select and strike those keys on the keyboard 40 in the displayed order. This causes the keyboard 40 successively to deliver corresponding keying coded signals D to the comparison circuit 108. Each coded signal D is quite identical in the coded form to the character signal B read out by the program reader 10 as long as the character remains unchanged and therefore is formed of seven bits. The seven bits of each keying signal D are applied in parallel relationship to the comparison circuit 108.

In the comparison circuit 108, the keying signal D is compared with the character signal B supplied to the circuit 108 through the latching circuit 106 for each character. If the keying signal D is identical to a corresponding signal block of the character signal B as determined by the comparison circuit 108, then a coincidence signal $d$ having a value of logic ONE is produced by the comparison circuit 108. On the contrary, the determination that the signal D is not identical to the signal block results in the formation of a non-coincidence signal $e$ having a value of logic ONE.

As above described, the signal is blocks of the character signal B developed at the input to the latching circuit 106 are continuously changed from one to another of the characters at high speed. This is true in the case of the signal blocks applied to the comparison circuit 108 through the latching circuit 106. Upon the comparison of the signals, a keying signal D just applied to the comparison circuit 108 must be compared with that signal block of the character signal supplied through the latching circuit 106 and assigned for the same character as the applied keying signal. To this end, means is provided for sensing the addresses of the signal blocks of the character signals recirculating through the second and third shift registers 102 and 103 respectively and utilizing the sensed addresses to effect the comparison of signals when that signal block of the character signal assigned for a correct character for the keying signal is present in the comparison circuit although such means is not illustrated in FIG. 3.

It is recalled that when the student successively strike correct keys on the keyboard 40 in response to characters displayed on the display unit 30, the displayed characters disappear one after another until the display device 30 displays no character. On the contrary, the student may strike an incorrect key on the keyboard 40 in the course of striking a word displayed on the display unit. In the latter event, all the characters originally displayed on the display unit 30 are caused to be again displayed on the display unit 30.

It is also recalled that the second shift register 102 has the eight bit positions and is operative to add the additional bit following the last bit of each of the signal blocks of the character signal from the first shift register 101 to deliver an 8-bit output to both the third shift register 103 and the latching circuit 106. This additional bit is normally of a logic ZERO value because no signal is applied to the same. Thus the output from the latching circuit 106 along the lead $c$ comprises the last or eighth bit having a value of logic ZERO. When receiving the additional bit of logic ZERO, the character signal generator 107 is operated to cause that character signal mating with the additional bit of logic ZERO to be displayed as a corresponding character, on the display unit. On the other hand, if the additional bit is of a logic ONE value, the character signal generator 107 is operated to cause the display unit 30 to display no character.

Since the character signal recirculates at a high speed through the closed loop memory including the second and third shift registers 102 and 103 respectively, there is provided means for producing a synchronizing signal $t_2$ from a synchronization generator (not shown) each time the additional bit following the last bit of each signal block of the character signal reaches the leftmost bit position as viewed in FIG. 3 in the second shift register 102. Then the synchronizng signal $t_2$ is applied to the other input of the AND gate 109 including one input having the coincidence signal $d$ applied thereto from the comparison circuit 108. Thus the AND gate 109 produces an output $f$ having a value of logic ONE. In other words, when a correct key is struck, the AND gate 109 produces the output $f$ at such a time point that a value of logic ONE is permitted to be written in the last or eighth bit of the keying signal D resulting from the struck key. This output $f$ passes through the OR gate 105 to be written in the corresponding signal block of the character signal at the leftmost bit position of the second shift register 102. Thus when developed at the output of the latching circuit 106--1, that signal block of the recirculating character signal assigned for the keyed character has always the last bit $c$ of logic ONE value resulting in the erasure or disappearance of the correctly keyed character from the display unit 30.

From the foregoing it will be appreciated that the student correctly strikes the keys one after another in the correct order to permit the characters displayed on the display unit 30 to be successively erased until no character is displayed on the display unit 30.

However, if the student strikes an erroneous key of the keyboard 40 in the training step, then the comparison circuit 108 applies a non-coincidence signal $e$ to the delay circuit 110 where the signal is widened in pulsewidth. The delayed output $g$ from the delay circuit 110 has a pulsewidth somewhat longer than a time period for which all the stored signal blocks effect one complete circulation through the closed loop including the second and third shift registers 102 and 103 respectively. The output $g$ thus widened is applied to the other input of the AND gate 111 having the one input which receives the synchronizing signal $t_2$ as above described. Therefore the AND gate 111 produces an output $h$ having a value of logic ONE in synchronization with the appearance of the last or eighth bit of each signal block during one complete circulation thereof through the closed loop including the second and third shift registers 102 and 103, the inhibit gate 104 and the OR gate 105. In the absence of the synchronizing signal $t_2$ at the one input thereto, the AND gate 111 produce an output $h$ having a value of logic ZERO.

The ZERO output $h$ from the AND gate 111 is applied to the other or inhibit input of the inhibit gate 104. Under these circumstances, the bits of the recirculating signal blocks are permitted to pass through the inhibit gate 104 while remaining intact. However, the application of the ONE output $h$ to the inhibit gate 104 inhibits the bits from passing therethrough and provides an output $j$ having a value of logic ZERO.

Thus it will be appreciated that in all the signal blocks passed through the inhibit gate 104 during one complete circulation thereof the character data $i$ have the eighth bit of logic ZERO value. This means that the student is required again to strike the correct keys on the keyboard 40.

In this way the student correctly strikes those key bearing the characters displayed on the display unit 30. At that time the comparison circuit 108 supplies to the program control circuit 11 an output $k$ indicating that the characters displayed on the display device 30 has been correctly struck. The control circuit 11 responds to that output $k$ to supply a start signal $a$ to the program reader 10 thereby automatically driving the latter. Then the program reader 10 reads out the next succeeding problem and the student repeats the process as above described in conjunction with the given problem.

Thereafter the process as above described is repeated in conjunction with the remaining succeeding problems to complete one training course whereupon the program reader 10 applies a complete signal 1 to the estimation indicator 50. Thus error indicator 51 (see FIG. 1) indicates the number of errors made by the student while the time keeper 52 (see FIG. 1) indicates a time interval required for the student to complete the particular training course. The number of the errors is the total of the non-coincidence signals $e$ applied to the indicator 50 as shown in FIG. 3.

The training apparatus for keyboards as above described can be used to train students in a wide range of courses from the elementary course to a high standard course.

For example, the training apparatus of the present invention can be used to repeatedly explain the proper posture for operating the keyboard, guide keys, the way to strike keys as well as training a student to remember keys allotted to his or her fingers respectively and positions of characters on the keyboard in the elementary course wherein the explanation using voices plays an important role. More specifically, the student is first trained so that, by displaying only one of those characters borne on the guide keys, on the display unit 30, his or her finger correctly responds to the displayed character in terms of each of such characters. Then the same training is repeated with each of characters borne on those keys except for the guide keys. Following this the student is trained for various combinations of the characters borne on the guide keys and the remaining keys until his or her fingers are respond by reflect in response to the display of such combinations of the characters.

In the next succeeding stage of training, series of continuous characters are displayed on the display device 30. In that stage, the training starts with a series of keys easily struck and proceeds toward series of keys difficult to be struck. Thereafter the student is trained to operate the keys for practical business purposes including those keys expressing wording usually employed, long wording, the space bar, or key, the shift key etc. The present invention can perform all the training operations as above described by only changing the program contained in the program reader.

While the present invention has been illustrated and described in conjunction with a single preferred embodiment thereof it is to be understood that numerous changes and modifications may be resorted to without departing from the spirit and scope of the present invention. For example, the character signal B may include any desired maximum number of the characters other than sixteen (16) with the display positions of the display device equal in the number to the characters included in the same. Also each character may be expressed by any desired number of bits different than that illustrated. Further the display device may be formed of a cathode ray tube, if desired.

What we claim is:

1. A portable training machine for training keyboard operation comprising, in combination, program reader means for reading out a character coded signal including a plurality of binary coded signal blocks which form a word, display means for displaying characters represented by said plurality of binary coded signal blocks which form said word, keyboard means including a plurality of keys bearing different characters thereon, said keyboard means delivering binary coded signal blocks representing those characters borne on said keys when a student strikes the keys in accordance with said word displayed on said display means, said binary coded signal block from said keyboard means being identical to that from said program reader means for the same character, and control means connected to both said program reader means and said keyboard means to successively compare said binary coded signal blocks from said keyboard means with corresponding binary coded signal blocks from said program reader means to thereby successively erase said characters of said word displayed on said display means when the keys are correctly struck and cause said word to be again displayed on said display means when a key is erroneously struck during the striking of the keys corresponding to the words, said control means further including means for adding to each of said binary coded signal blocks of said character coded signal an additional bit for determining whether a character represented by the binary coded signal block with said additional bit is display on said display means, wherein said control means includes a closed loop memory including a pair of shift registers serially connected, said binary coded signals blocks of said character coded signal being stored in said closed loop memory while recirculating at a high speed therethrough, means for adding an additional bit to each of said binary coded signal blocks entered into one of said shift registers, said display means being responsive to said additional bit for permitting an associated signal block to be displayed as a character on said display means, a latching circuit connected to the one shift register to latch each of said binary coded signal blocks each time it is transferred thereto, a comparison circuit connected to both said keyboard means and said latching circuit to successively compare said binary coded signal blocks from said keyboard means with corresponding binary coded signal blocks from said latching circuit to produce a coincidence signal when each pair of said compared signal blocks are identical to each other and to produce a non-coincidence signal when said pair of compared signal blocks are different from each other, circuit means responsive to said coincidence signal to change said additional bit coupled to that signal block compared with the correct signal block from said keyboard means to erase that character represented by the signal block coupled thereto, and display on said display means, and another circuit means responsive to said non-coincidence signal to return the changed additional bit back to its original bit thereby to again display all the original characters on said display means.

2. A training machine for a keyboard as claimed in claim 1, wherein said circuit means responsive to said coincidence signal includes an AND gate and an OR gate for writing a value of logic ONE into the last bit position of that character binary coded signal block registered in said pair of shift registers, and said another circuit means responsive to said non-coincidence signal includes a delay circuit receptive of said non-coincidence signal to produce a delayed output having a pulse width somewhat longer than a time period required for the character binary coded signal to recirculate through said pair of shift registers, an AND gate receptive of both said delayed output from said delay circuit and a signal synchronized with the last bit of each signal block of the character binary coded signal recirculating through said pair of shift register, and an inhibit circuit responsive to an output from said AND gate to change said last bit to have a value of logic ZERO.

3. A training machine for a keyboard as claimed in claim 1, wherein a first shift register is connected to said program reader to temporarily register the character binary coded signal for each character and said pair of shift registers are formed of a second shift register connected in parallel with said first shift register and a third register connected in series with said second shift register.

4. A training machine for a keyboard as claimed in claim 3 wherein said first shift register includes seven bit positions, said second shift register includes eight bit positions and said third shift register includes $8 \times n$ bit positions where $n$ is an integer, whereby said display means can display $(n + 1)$ characters.

* * * * *